Sept. 6, 1966          H. KUIPERS          3,270,898
VEHICLE PARKING SYSTEM
Filed July 30, 1964          5 Sheets-Sheet 1
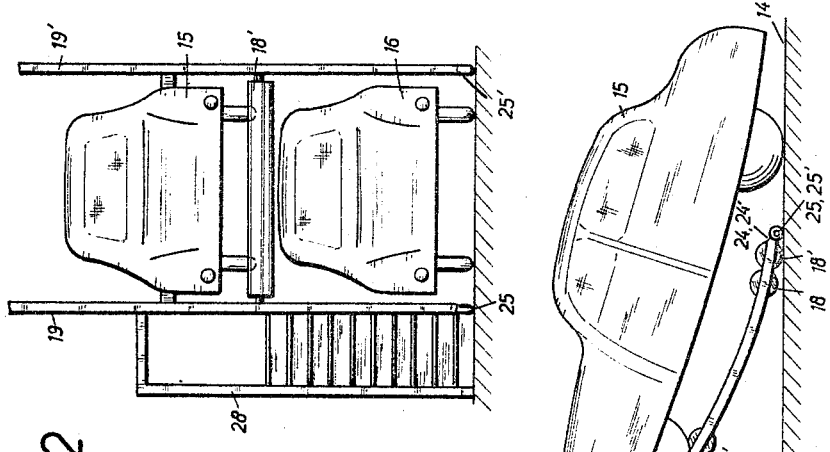
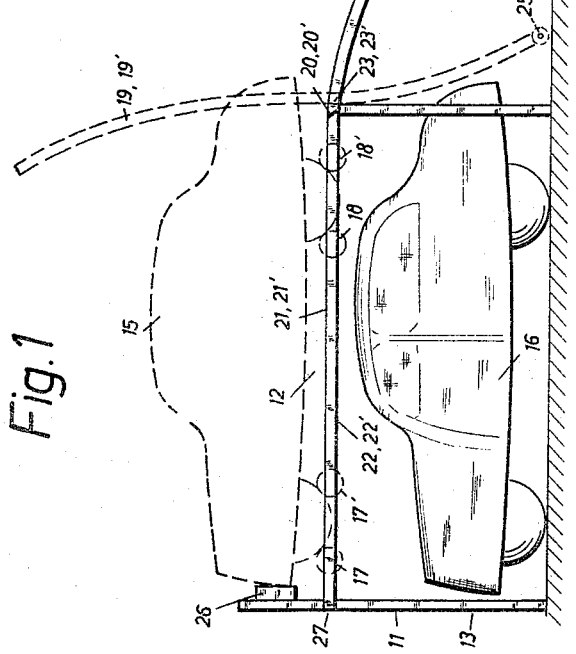

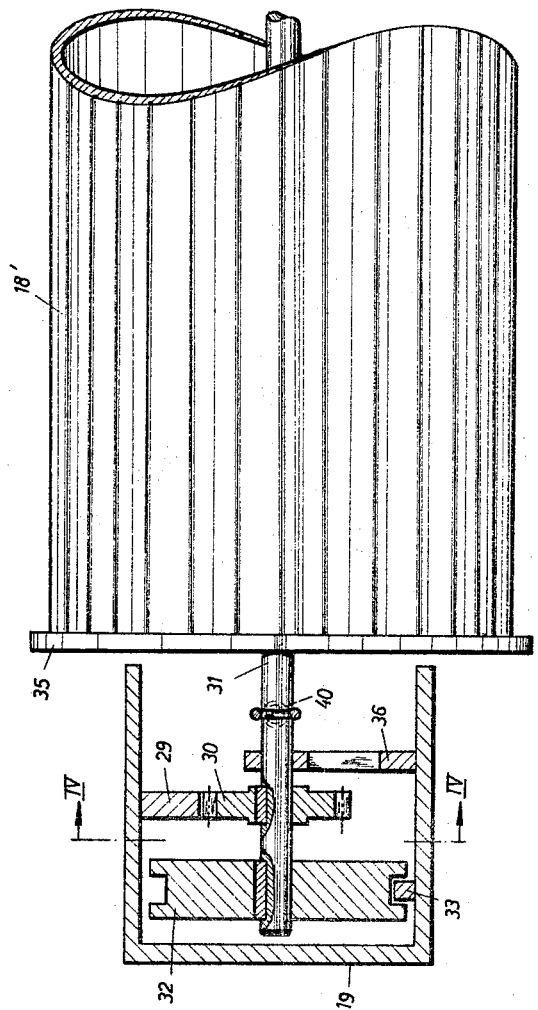

Sept. 6, 1966   H. KUIPERS   3,270,898
VEHICLE PARKING SYSTEM
Filed July 30, 1964   5 Sheets-Sheet 3
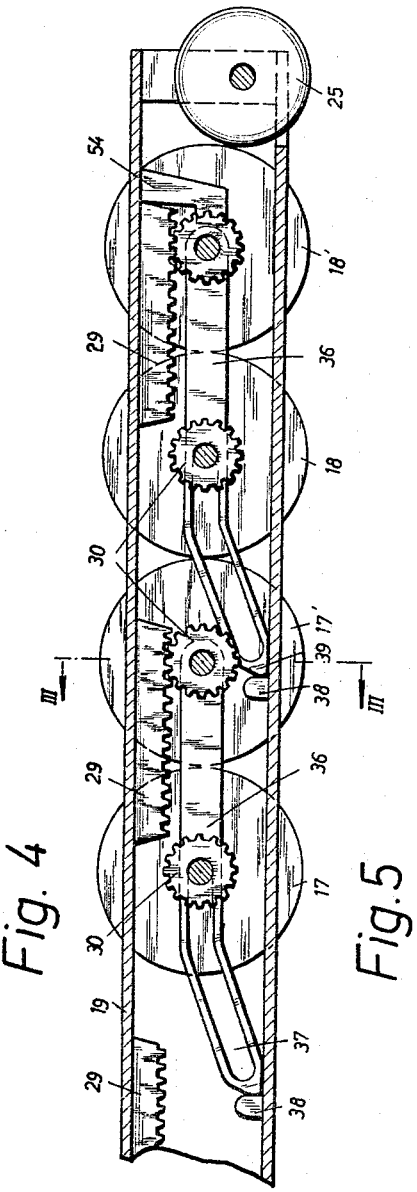
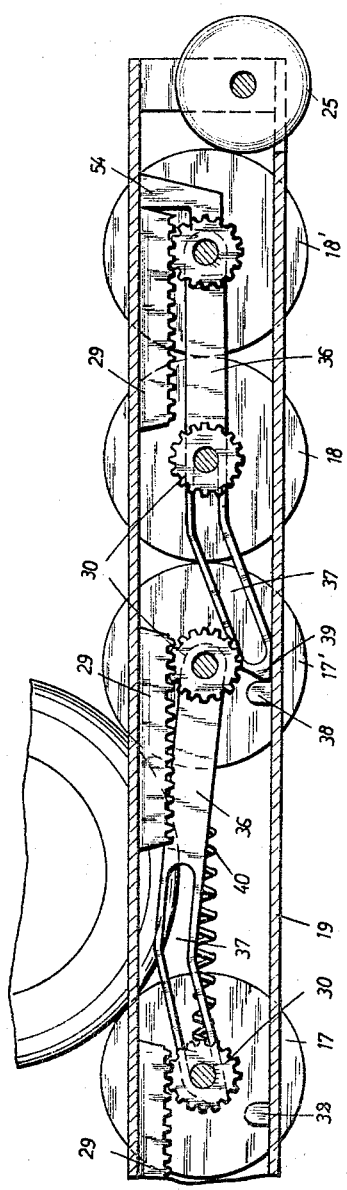

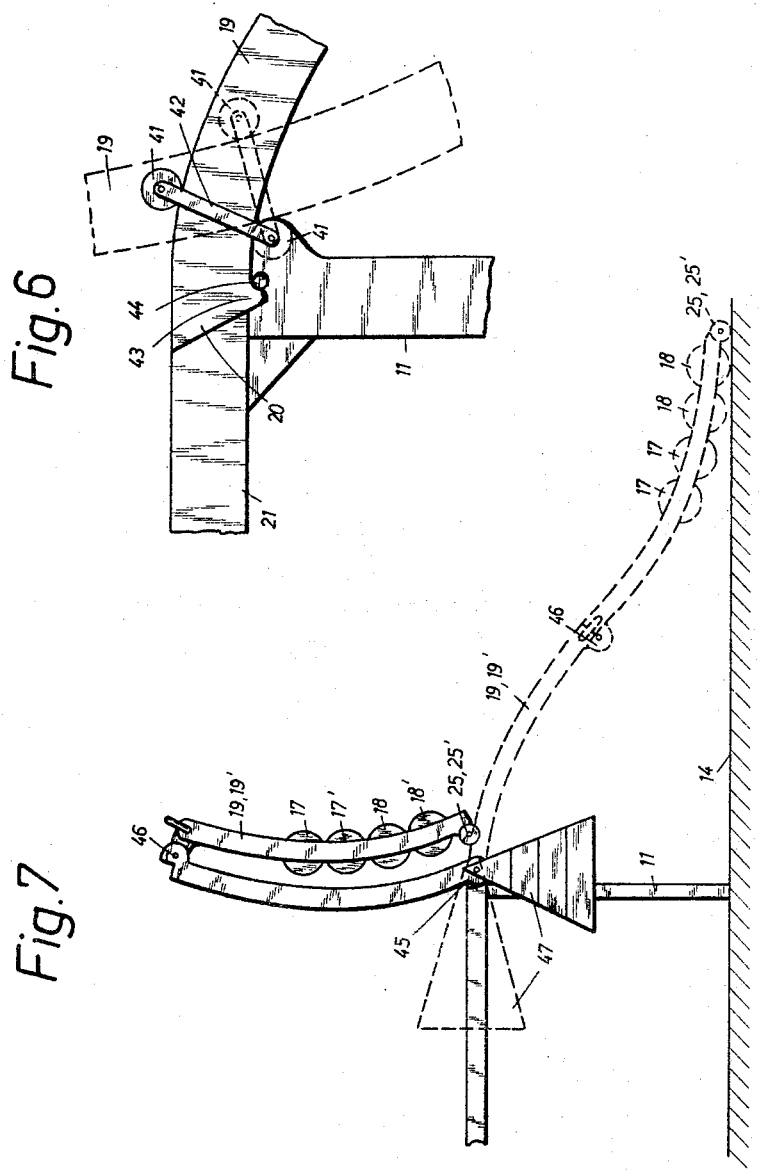

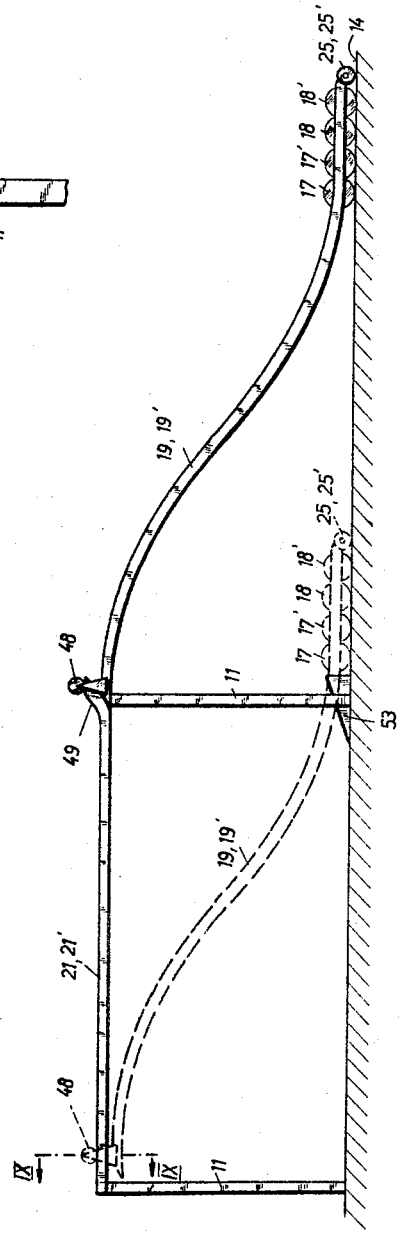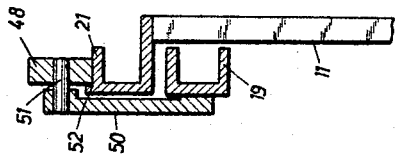

United States Patent Office 3,270,898
Patented Sept. 6, 1966

3,270,898
VEHICLE PARKING SYSTEM
Heinrich Kuipers, Humboldtstrasse 74a,
Dusseldorf, Germany
Filed July 30, 1964, Ser. No. 386,200
Claims priority, application Germany, July 31, 1963,
K 50,393
18 Claims. (Cl. 214—16.1)

This invention relates in general to vehicle parking systems and more particularly to a vehicle parking system wherein vehicles may be stored in an elevated position above a base surface.

Because of the constantly increasing shortage of space for parking and storing vehicles, it has become particularly desirable in vehicle parking systems to provide means whereby vehicles may be driven onto elevated racks for storage, thus enabling additional vehicles to be parked below.

It is also highly desirable in such parking systems, that the means for transferring vehicles to and from their elevated storage positions be compact in size and/or capable of being removed to a convenient location when not in actual use, so as to conserve space.

In the parking system of the instant invention, the front and rear wheels of the vehicle to be elevated for storage are supported by pairs of rolls guided in two parallel guide rails. One pair of rolls, corresponding to that which is driven by the driving wheels of the vehicle, transmits the power from the driving wheels to a pinion which engages a rack on one of the guide rails to move the vehicle either up or down along the guide rails. The other pair of rolls, which support the free wheels of the vehicle, merely move with the vehicle.

The guide rails extend from a base surface, such as a garage floor, to a substantially horizontal parking frame above, and are so inclined as to mate with similar guide rails provided in the parking frame, for receiving the roll pairs supporting the vehicle. When not actually supporting a vehicle, the roll pairs are disposed in that portion of the guide rails adjacent to the end which contacts the base surface, so as to permit a vehicle to be driven from the base surface onto the rolls, and up onto the parking frame.

After the vehicle is in position on the parking frame, the guide rails may be removed or stowed in the manner hereinafter described so as to permit another vehicle to be parked underneath the parking frame.

Vehicle parking systems heretofore used were subject to the disadvantage of requiring relatively large amounts of space for driving vehicles onto their upper parking spots. To avoid this problem, some systems have been built wherein the vehicles to be parked are placed on a plate, or platform, which is then raised to a sufficiently elevated position so as to permit another vehicle to be parked beneath. In these systems, however, the elevated vehicle can be brought down only after the lower vehicle has been removed.

To eliminate this disadvantage, some systems have been provided for parking vehicles on rotatable platforms that can be swung upward into an elevated position and lowered to discharge the vehicle whether or not any vehicles are parked in the area underneath. In such systems, the raising and swinging of the vehicle platform has been accomplished either by means of independent driving units, or by transferring the engine power of the vehicle to suitable elevating and rotating apparatus.

For example, one type of parking system in which the power from the vehicle driving wheels is used for swinging up the parking platform provides curved guide rails, disposed laterally of the platform, which with the aid of wheels, serve to guide the platform into its desired position. These guide rails also have racks which engage pinions for driving the platform. An endless belt running over rolls serves for the transmission of power from the driving wheels of the vehicle to the driving mechanism for swinging up the platform. This particular system, with its numerous moving parts, presents rather severe maintenance problems, and a relatively low mechanical efficiency.

The vehicle parking system of the present invention provides for the parking of vehicles in elevated positions on frames, is operated by the power of the vehicles alone, can be used by both front wheel and rear wheel drive vehicles, and is adapted for use by vehicles having various wheel base dimensions.

It is therefore, an object of the invention to provide a vehicle parking system wherein vehicles may be easily driven onto a parking rack for storage in an elevated position above a base surface, and removed therefrom, under their own power.

Another object of the invention is to provide a vehicle parking system as aforesaid, which is adapted for use by both front wheel and rear wheel drive vehicles, and by vehicles of various wheel base dimensions.

Still another object of the invention is to provide a vehicle parking system as aforesaid wherein the means for transferring vehicles to and from their elevated storage positions is compact in size, and is capable of being conveniently stowed when not in actual use.

Other and further objects and advantages of the invention will appear in, or become apparent from the following detailed description and accompanying drawings wherein:

FIG. 1 is a side elevation view of a vehacle parking system embodying the invention and wherein a parked vehicle and the guide rails in their stowed position are indicated by broken lines.

FIG. 2 is an elevation view of the vehicle parking system of FIG. 1, looking towards the rear of the parked vehicle, and showing additionally, a stairway for access to said parked vehicle.

FIG. 3 is a transverse section view of one of the guide rails, taken along the line III–III of FIG. 4 adjacent to the end of the rail which contacts the base surface and looking toward that end, showing a typical arrangement for guiding and driving one of the roll pairs.

FIG. 4 is a reduced sectional view taken along the line IV–IV of FIG. 3, showing the roll pairs in position to receive a vehicle.

FIG. 5 is another sectional view taken along the line IV—IV of FIG. 3, showing the position assumed by the roll pairs when the front wheels of the vehicle are supported by the forward pair of rolls.

FIG. 6 is a side elevation view showing the details of a means for stowing the guide rails in the position indicated by broken lines in FIG. 1.

FIG. 7 is a side elevation view showing the details of an alternate arrangement for folding up the guide rails, when not in use.

FIG. 8 is a side elevation view, showing another alternate arrangement indicated by broken lines, wherein the guide rails slide under the parking frame when not in use.

FIG. 9 is a transverse section, taken along the line IX—IX of FIG. 8, showing the details of a typical guided roller for sliding the guide rails under the parking frame.

Referring to FIG. 1, a parking rack 11, having a substantially horizontal and rectangular vehicle support frame 12, which is supported at each of its four corners by columns 13, said columns being fixedly secured to a base surface, or floor 14, is provided for parking a vehicle 15, in an elevated position above the floor 14 in the position indicated by phantom lines. The height of the columns 13, and the dimensions of the frame 12 are such as to permit another vehicle 16 to be parked underneath the first vehicle 15.

If desired, a covering, such as a sheet-metal pan (not shown) can be inserted between the upper vehicle 15 and the lower vehicle 16 so as to prevent dirty water or oil from dripping from vehicle 15 onto vehicle 16.

Vehicle 15, as shown on the parking rack 11, is supported by rolls 17, 17′ and 18, 18′, which serve to carry it into its elevated position. The rolls 17, 17′ and 18, 18′ are guided in guide rails 19, 19′, laterally disposed, one on each side of the vehicle 15. The guide rails 19, 19′ terminate at joints 20, 20′ where they mate with similar guide rail sections 21, 21′ secured to the lateral members 22, 22′ of the frame 12. At the joints 20, 20′, proper mating of the guide rails 19, 19′ with the rail sections 21, 21′ is provided by conventional fastening means 23, 23′ which secure the guide rails 19, 19′ to the rail sections 21, 21′ and which are removable so as to permit the guide rails 19, 19′ to be pushed up into the position shown in broken lines in FIG. 1. From the joints 20, 21′, the guide rails 19, 19′ extend sloping downward to their ends 24, 24′ where they contact the floor 14. If desired, rollers 25, 25′ may be attached to the ends 24, 24′ so as to facilitate moving the guide rails 19, 19′ into the aforesaid broken line position.

As will be hereinafter described in greater detail, the rolls 17, 17′ and 18, 18′ are responsive to the rotation of the wheels of the vehicle 15 and cooperate with the guide rails 19, 19′ and rail sections 21, 21′ to drive the vehicle 15 up into its desired elevated position.

In ascending to the aforesaid position, the front wheels of the vehicle 15 first pass from the floor 14 up over the rear rolls 18, 18′ and are seated between the front rolls 17, 17′. If the front wheels of the vehicle 15 are its driving wheels, the power from said wheels is transmitted to the rolls 17, 17′ to pull the vehicle 15 up into its parking position. In such a case the rear wheels of the vehicle 15 are pulled up and seated between the rear rolls 18, 18′ and the rolls 18, 18′ supporting the rear wheels will follow the rolls 17, 17′ and front wheels up the guide rails 19, 19′ and into the parking position. Conversely, if the rear wheels of the vehicle 15 are its driving wheels, the vehicle 15 ascends in substantially the same manner; however, the front wheels are pushed up in the rolls 17, 17′ by the action of the power transmitted through the rear driving wheels and rolls 18, 18′. In either case, and even if both the front and rear wheels of the vehicle 15 are driving wheels, the front wheels of the vehicle 15 pass over the rolls 18, 18′, and seat between the rolls 17, 17′, and the rear wheels of the vehicle 15 will seat between the rolls 18, 18′.

By using rail sections 21, 21′ similar to and mating with the guide rails 19, 19′, the rolls 17, 17′ and 18, 18′ and vehicle 15 are readily transferred into the parking position on the rack 11.

To prevent the vehicle 15 from being driven off the forward end of the rack 11, a barrier 26, secured to the forward member 27 of the frame 12 is provided. Since it is assumed that the vehicle 15 has brakes, or other means for locking its wheels, it is not necessary to provide another barrier, or restraining means (not shown) in order to prevent the vehicle 15 from rolling off the rear end of the rack 11, because as will be described in detail later, the rolls 17, 17′ and 18, 18′ cannot move when their corresponding vehicle 15 wheels are locked. However, if desired, such an additional restraining means can be provided for additional safety.

FIG. 2, which is an elevation view of the parking system of the invention, looking towards the rear of the vehicles 15 and 16, shows the guide rails 19, 19′ in their stowed position. A stairway 28 is provided for access to the upper vehicle 15. The stairway 28 is a conventional stairway and may be either fixed in relation to the parking rack 11, or removable, as desired.

FIG. 3, which is a transverse section of the guide rail 19, taken adjacent to the end 24, and looking toward said end 24, shows the guide rail 19 as having a generally U-shaped cross-section. Secured to the upper part of the guide rail 19, is a rack 29 with which a pinion 30 meshes. (It is to be understood in connection with the description of FIG. 3 that the rolls 17, 17′ and 18, 18′ are in the position indicated by FIG. 8, i.e. the guide rails 19, 19′ and rolls 17, 17′ and 18, 18′ are in their initial position to receive a vehicle 15). The pinion 30 is fastened to the roll 18′ so as to rotate therewith by means of a shaft 31. If desired, and it may be advantageous to do so, pinions 30 which can be engaged and disengaged by means of clutches (not shown) may be provided for all four rolls 17, 17′ and 18, 18′ to assure that when, for example, a vehicle 15 with rear-wheel drive is to be parked on the parking rack 11, its front wheels will not roll over the rolls 17, 17′ if said rolls 17, 17′ are retarded on account of the transmission ratio between the rack 29 and pinions 30 and therefore run forward more slowly than the speed corresponding to the speed of the vehicle 15. The size and pitch of the rack 29 and pinions 30 are selected so as to provide for a favorable power transmission.

A grooved running wheel 32, also fastened to the shaft 31, cooperates with a guide strip 33 fastened to the bottom portion of the guide rail 19. The wheel 32 serves to prevent axial motion of the shaft 31 and thus assures that the rack 29 and pinion 30 will be aligned to mesh.

In order to prevent the roll pairs 17, 17′ and 18, 18′ from moving until their corresponding vehicle wheels are seated, an appropriate blocking means 38 is furthermore provided as will be hereinafter described in greater detail.

If desired, the rolls 17, 17′ and 18, 18′ can be provided with an appropriate fluting, so as to improve their cooperation with the vehicle 15 wheels.

In order to prevent the vehicle 15 wheels from overrunning the rolls 17, 17′ and 18, 18′ laterally, said rolls 17, 17′ and 18, 18′ may be provided with flanges 35 at their extremities. Alternately, the aforesaid overrunning can be prevented by broadening the rolls 17, 17′ and 18, 18′ conically at their extremities.

As shown in FIGS. 4 and 5, the shafts 31 of the front and rear roll pairs (17, 17′) and (18, 18′) respectively, are connected together by means of links 36, each of which has an elongated cam-shaped slot 37. The links 36 cooperate with their respective lugs 38, which are secured to the lower portion of the guide rail 19, to prevent the roll pairs (17, 17′) and (18, 18′) from moving in the guide rails 19, 19′ until their corresponding vehicle 15 wheels are seated.

In FIG. 4, which shows the configuration assumed by the rolls 17, 17′ and 18, 18′ and links 36 prior to receiving a vehicle 15, the shafts 31 corresponding to the rolls 17 and 18, and which slide in the slots 37 are held against the ends of said slots 37 by tension springs (not shown) so as to permit the ends 39 of the links 36 to engage the lugs 38, thus preventing the rollers 17′ and 18′ which have their respective shafts 31 journalled through the links 36, from advancing.

In order to prevent the roll 18′ from turning or slipping out from the guide rails 19, 19′ before the vehicle 15 wheels are seated, an appropriate blocking means 54 is furthermore provided.

When the vehicle 15 is driven on to be parked, its front wheels first pass over the roll 18′. Because the pinion 30 for the roll 18′ is in mesh with the rack 29 and the link 36 is engaged by the lug 38, the roll 18′ cannot turn, and hence the front wheels fall in between the rolls 18′ and 18. Likewise, the roll 17′ is prevented from turning. When the front wheels of the vehicle 15 are between the rolls 18 and 18′, the roll 18 is pressed against the roll 17′, and thus is restricted by friction from turning, thereby permitting said front wheels to pass over said rolls 18 and 17′, and to be seated between the rolls 17′ and 17.

When the front wheels are seated between the rolls 17 and 17', said rolls 17 and 17' are spread apart, and assume the position shown in FIG. 5. It is to be noted that the rack 29 is interrupted in two sections so as to permit the shafts 31 on rolls 18 and 17 to slide in their respective slots 37, and disengage the links 36 from the lugs 38. Otherwise, if the rack 29 were continuous, the friction between the running wheels 32 and guide strip 33 would have to be overcome in separating the rolls 17, 17' and 18, 18'. Except for the aforesaid two interrupted sections, the rack 29 is continuous over the remainder of the guide rail 19, and over the rail section 21.

In the spread-apart position, as shown by FIG. 5, the pinion 30 for the roll 17 engages the rack 29.

If the driving wheels of the vehicle 15 are its front wheels, the power from said wheels will be transmitted through the rolls 17 and 17' and the pinions 30 to pull the vehicle up to its parking position.

For vehicles 15 having rear wheel drives, it is necessary to disengage the pinions 30 for the rolls 17 and 17' by means of clutches (not shown) since the danger exists that the front wheels will run past the front roll 17 because the speed of the vehicle is determined by its rear wheels whereas the speed of the rolls 17 and 17' depends upon the transmission ratio between the rack 29 and pinions 30. By disengaging the pinions 30 so as to permit the shafts 31 for the rolls 17 and 17' to be independently rotatable, the aforesaid danger can be avoided.

Thus, with rear wheel drive vehicles 15, their front wheels are pushed up in the rolls 17 and 17' and the pinions 30 are disengaged as aforesaid.

In a like manner, when the rolls 17 and 17' are moved upward and forward by the front wheels of the vehicle 15, the rear wheels pass over the roll 18', seat between rolls 18 and 18', thus disengaging the link 36 so as to permit the rolls 18 and 18' to assume a position similar to that shown for the rolls 17 and 17' in FIG. 5.

It is to be noted that the links 36 limit the maximum spacing between the pairs of rolls (17, 17') and (18, 18').

Between the roll pairs (17, 17') and (18, 18') there are disposed tension springs (not shown in FIGS. 4 and 5) which are connected at their extremities by conventional means 40 to the shafts 31, as shown in FIG. 3. These springs cause the rolls 17, 17' and 18, 18' to be drawn back to their starting positions when relieved of their loads, whereby they are likewise locked.

If desired, other conventional locking arrangements may be provided for the roll pairs (17, 17') and (18, 18').

It is to be understood, however, that while the foregoing description relating to FIGS. 3, 4 and 5 was directed primarily at the mechanism associated with the guide rail 19, that said mechanism can be duplicated for use with the other guide rail 19', if desired.

If it is desirable or necessary for the guide rails 19, 19' to be pushed upward when not in use, for reasons of economy of space, pairs of rollers 41 can be provided as shown in FIG. 6. In the typical arrangement of FIG. 6, one of the rollers 41 of said pairs is fixedly mounted to the parking rack 11, and disposed so as to contact the under side of the guide rail 19. The other roller in the same pair is movable and is constrained by the links 42 so that when the guide rail 19 is lifted into the broken line position, it slides between the rollers 41.

To assure proper mating of the guide rail 19 with its corresponding rail section 21 on the frame 12, said guide rail 19 may be provided with lugs 43 which engage behind pins, or studs 44 extending out from the parking rack 11.

An alternative arrangement for stowing the guide rails 19, 19' is shown typically in FIG. 7. In this arrangement the guide rails 19, 19' are hingedly fastened to the parking rack 11 by means of the articulation 45. A second articulation 46 is provided in each of the guide rails 19, 19', located approximately at their midpoints, for folding said guide rails 19, 19'. The second articulation 46 is provided with a locking device (not shown) to prevent unintentional folding of the guide rails 19, 19'.

If desired, a counterweight 47, fastened to each of the guide rails 19, 19' may be provided in order to facilitate the folding up of the guide rails 19, 19'.

As shown in FIG. 8, the guide rails 19, 19' may be slid under the parking rack 11, instead of stowed as described in FIGS. 6 and 7. For this purpose the top surfaces of the rail sections 21, 21' serve as running surfaces for the rollers 48 which are fastened to the guide rails 19, 19' as hereinafter described in connection with FIG. 9.

In order to be able to move the guide rails 19, 19' into the broken line position shown in FIG. 8, said guide rails 19, 19' must be lowered at the beginning of the action by pushing them into a position somewhat beneath the rail sections 21, 21'. For this purpose, cam-like elevation surfaces 49 are provided on the upper sides of the rail sections 21, 21'.

To form a stop for the rails 17, 17' and 18, 18' and to end the slide of the guide rails 19, 19' a triangular shaped wedge 24 may be arranged on the floor 14 at the forward end of the parking rack.

Locking devices (not shown) are provided to prevent the unintentional pushing in the guide rails 19, 19'.

In FIG. 9, which typically illustrates how the guide rails are supported by the rail sections 21, 21' when pushed under the parking rack 11, the guide rail 19 is provided with a roller support 50 having a shaft 51 which carries the roller 48. The upper surface of the rail section 21 is provided with a lip 52 to prevent said roller 48 from dropping off when the guide rail 19 is pushed under the parking rack 11.

It should be noticed in connection with the foregoing description of the invention, that chains (not shown) can be substituted for the racks 29, if desired.

Furthermore, a cable drum (not shown) can be applied to the driven roll 18' for example, so as to receive a cable (not shown) which is fastened to the top of the parking rack 11 in such a manner that, as the roll 18' is rotated by the driving wheel of the vehicle 15, said roll 18' is either pulled upward or rolls downward as required.

In connection with the instant invention it should also be noted that the place for the lower vehicle 16 can be set lower than the level of the floor 14, for example, by using an inclined driveway (not shown), so that the height of the parking rack 11 above the floor 14 can be reduced accordingly. Furthermore, it is not necessary that a parking place be provided for a vehicle 16 underneath the parking rack 11.

As to the elevation contour of the guide rails 19, 19', it has been found that the most favorable contour is one in which the slope is slighter at the beginning, and then at a turning point, assumes a steeper inclination.

What is claimed is:

1. A system for parking a self-propelled vehicle in an elevated position above a base surface, said vehicle being of a type having wheels mounted on two or more axles, with the wheels on at least one axle being drive wheels, which comprises:

(a) A frame having a pair of parallel guide rail sections;

(b) Means for fixedly supporting said frame in an elevated position above the base surface;

(c) A pair of parallel guide rails extending from the base surface up to said frame guide rail sections, and disposed so as to mate therewith;

(d) Means for supporting said guide rails so as to maintain their aforesaid mating relationship with the frame rail sections;

(e) Pairs of rolls for supporting the vehicle wheels, the number of said roll pairs corresponding to the number of axles on the vehicle, the rolls in each pair being disposed so as to contact the wheels on their corresponding axles and rotate in response to the rotation of said wheels, said roll pairs being disposed between said guide rails and supported thereby at their extremities so as to be capable of motion along the guide rails; and, (f) Means associated with the roll pair supporting the vehicle drive wheels for driving said roll pair in the guide rails in response to the rotation of said drive wheels, whereby the vehicle, supported by the roll pairs, can be driven up on the guide rails and onto the rail sections of the elevated frame under its own power.

2. The vehicle parking system of claim 1 wherein the means for driving the roll pair supporting the vehicle drive wheels includes a rack disposed on at least one guide rail, and at least one pinion mounted to the end of a roll in said pair so as to mesh with said rack.

3. The vehicle parking system of claim 1 wherein the means for driving the roll pair supporting the vehicle drive wheels includes a cable, fastened at one end to the frame, and a drum on one of the rolls in said pair for receiving said cable, whereby the rotation imparted by the vehicle drive wheels to said roll causes the cable to be reeled in on the drum, thereby pulling said roll pair and the vehicle up on the guide rails.

4. The vehicle parking system of claim 1 wherein the roll pairs are provided with locking means to prevent their progress in the guide rails in the unloaded state, whereby each roll pair is unable to advance in the guide rails until the corresponding vehicle wheels are disposed between the rolls of said pair.

5. The vehicle parking system of claim 1 wherein at least one tension spring is provided between the rolls of each roll pair to maintain said rolls in contact with their corresponding vehicle wheels.

6. The vehicle parking system of claim 1 wherein at least one slatted link is provided for each roll pair to the maximum spacing between the rolls of said pair.

7. The vehicle parking system of claim 1 wherein the guide rails and frame rail sections are provided with guide strips and each roll is provided with an axial shaft and a running wheel mounted thereupon at each end of said roll to engage said guide strips.

8. The vehicle parking system of claim 7 wherein the running wheels are grooved wheels and the guide strips engage the grooves in said wheels.

9. The vehicle parking system of claim 1 wherein the guide rails have a U-shaped cross-section.

10. The vehicle parking system of claim 2 wherein the guide rails have U-shaped cross-sections, the open portions of which face the ends of the rolls, and each rack is secured to the interior surface of the upper flange of its corresponding guide rail.

11. The vehicle parking system of claim 1 wherein the guide rails can be disengaged from their mating relationship with the frame rail sections and slidably displaced in the direction toward the frame with one end of each guide rail remaining in contact with the base surface so as to permit said guide rails to be pushed upward and in toward the frame.

12. The vehicle parking system of claim 1 wherein the guide rails are provided with rollers at their base surface contact points.

13. The vehicle parking system of claim 11 wherein the guide rails are guided between a pair of rollers when they are pushed up, one roller of said pair being rotatably fastened to the frame.

14. The vehicle parking system of claim 1 wherein the guide rails are fastened by articulations to the frame so as to be swingable upward.

15. The vehicle parking system of claim 14 wherein an additional articulation is provided at approximately the mid-point of each guide rail so as to permit said guide rails to be folded about their mid-points and swing upward.

16. The vehicle parking system of claim 15 wherein counterweights, fastened to the guide rails at their frame articulations, are provided to facilitate swinging said guide rails upward.

17. The vehicle parking system of claim 1 wherein the guide rails are displaceable in the direction toward the frame, so as to be capable of being stowed underneath said frame.

18. A system for parking an automobile in an elevated position above a base surface, said automobile having a pair of front wheels and a pair of rear wheels, one of said pairs of wheels being drive wheels, which comprises:

(a) A substantially rectangular frame having a pair of parallel guide rail sections;

(b) Columns secured to each of the four corners of said frame, said columns extending from said frame corners to the base surface and secured thereto so as to fixedly support said frame at an elevated position above the base surface with its guide rail sections in a substantially horizontal attitude;

(c) A pair of inclined, parallel guide rails having the same cross-section as the frame rail sections, said guide rails extending from the base surface up to the ends of said frame rail sections, and being disposed so as to mate therewith;

(d) A locking connection for securing the guide rails to their respective frame rail sections in the aforesaid mating relationship, said locking connection being capable of being disengaged to permit removal of the guide rails;

(e) A first pair of rolls for supporting the front wheels of the automobile, said rolls being disposed between the guide rails and constrained to move in a fixed path along said guide rails;

(f) A second pair of rolls for supporting the rear wheels of the automobile, said rolls being of the same construction as the first pair of rolls, said rolls also being disposed between the guide rails and constrained to move in a fixed path along said guide rails;

(g) A rack, secured to the inside of one of the guide rails and coextensive therewith; and, (h) A pinion, mounted to the end of at least one of the rolls in the pair which corresponds to the automobile drive wheels, said pinion being mounted so as to mesh with the rack and rotate with said roll, whereby the automobile, with its front and rear wheels supported by the first and second pair of rolls respectively, can be moved on the guide rails under its own power through the rotation imparted to said pinion by the roll in response to the rotation of the drive wheels.

References Cited by the Examiner
UNITED STATES PATENTS
2,538,517   1/1951   Hayden _____ 187—8.56
FOREIGN PATENTS
611,708   4/1935   Germany.

GERALD M. FORLENZA, *Primary Examiner.*

R. B. JOHNSON, *Assistant Examiner.*